US008674875B2

(12) United States Patent
Carter et al.

(10) Patent No.: US 8,674,875 B2
(45) Date of Patent: Mar. 18, 2014

(54) SCANNERS

(75) Inventors: Christopher Ralph Carter, Stevenage (GB); Charles Anthony Rowatt, Edgware (GB)

(73) Assignee: MBDA UK Limited, Hertfordshire (GB)

( * ) Notice: Subject to any disclaimer, the term of this patent is extended or adjusted under 35 U.S.C. 154(b) by 447 days.

(21) Appl. No.: 12/440,394

(22) PCT Filed: Sep. 7, 2007

(86) PCT No.: PCT/GB2007/003329
§ 371 (c)(1),
(2), (4) Date: Mar. 6, 2009

(87) PCT Pub. No.: WO2008/029117
PCT Pub. Date: Mar. 13, 2008

(65) Prior Publication Data
US 2010/0039309 A1    Feb. 18, 2010

(30) Foreign Application Priority Data
Sep. 7, 2006 (GB) .................................. 0617586.3

(51) Int. Cl.
*G01S 13/04*  (2006.01)
*G01S 13/32*  (2006.01)
*G01S 13/89*  (2006.01)
*G01S 13/00*  (2006.01)

(52) U.S. Cl.
USPC ............... 342/179; 342/22; 342/27; 342/118; 342/128; 342/147; 342/158; 342/175; 342/176; 342/188; 342/195

(58) Field of Classification Search
USPC ........... 342/21, 22, 59, 89, 90, 147, 158, 175, 342/176, 179, 195, 27, 28, 52–55, 118, 342/127–146, 188, 196, 361–366, 70
See application file for complete search history.

(56) References Cited

U.S. PATENT DOCUMENTS 3,713,156 A * 1/1973 Pothier ........................... 342/22
3,824,593 A * 7/1974 Baird ............................ 342/179

(Continued)

FOREIGN PATENT DOCUMENTS

GB    2 415 441 A    12/2005
WO   WO 90/07130 A1   6/1992

(Continued)

OTHER PUBLICATIONS

Form PCT/ISA/210 mailed Apr. 22, 2008.

(Continued)

*Primary Examiner* — Bernarr Gregory
(74) *Attorney, Agent, or Firm* — Buchanan Ingersoll & Rooney PC

(57) ABSTRACT

The invention provides a security scanner that produces a radar profile of a clothed person or another object such as a bag carried by a person at a distance and does not require close proximity of the person or object to the scanner itself. The scanner includes a millimeter wave antenna system optimised for short-range active imaging and arranged to provide rapid high-resolution images of an object or person of interest and processing means for resolving the images so as to detect the presence of predetermined objects. The processing means preferably includes means for comparing contrasts in reflectivity in the scanned images with predetermined expected values from skin and light clothing. The processing means may also include means for detecting predetermined behavioral or physical traits such as the effect on gait on carried weighty objects or stiff structures strapped to the person from the images of a scanned object or person. The scanner may be incorporated within a turnstile access arrangement.

14 Claims, 5 Drawing Sheets

(56) References Cited

U.S. PATENT DOCUMENTS

| | | | |
|---|---|---|---|
| 5,030,956 A * | 7/1991 | Murphy | 342/22 |
| 5,047,783 A * | 9/1991 | Hugenin | 342/179 |
| 5,073,782 A * | 12/1991 | Huguenin et al. | 342/179 |
| 5,081,456 A * | 1/1992 | Michiguchi et al. | 342/22 |
| 5,121,124 A * | 6/1992 | Spivey et al. | 342/179 |
| 5,170,169 A * | 12/1992 | Stephan | 342/179 |
| 5,202,692 A * | 4/1993 | Huguenin et al. | 342/179 |
| 5,227,797 A * | 7/1993 | Murphy | 342/22 |
| 5,227,800 A * | 7/1993 | Huguenin et al. | 342/179 |
| 5,420,589 A * | 5/1995 | Wells et al. | 342/22 |
| 5,446,461 A * | 8/1995 | Frazier | 342/22 |
| 5,486,832 A * | 1/1996 | Hulderman | 342/70 |
| 5,592,170 A * | 1/1997 | Price et al. | 342/22 |
| 5,668,555 A * | 9/1997 | Starr | 342/179 |
| 5,920,285 A * | 7/1999 | Benjamin | 342/22 |
| 6,121,920 A * | 9/2000 | Barrett | 342/188 |
| 6,359,582 B1 | 3/2002 | MacAleese et al. | 342/22 |
| 6,429,802 B1 * | 8/2002 | Roberts | 342/22 |
| 6,480,141 B1 * | 11/2002 | Toth et al. | 342/22 |
| 6,492,935 B1 * | 12/2002 | Higuchi | 342/70 |
| 6,501,414 B2 * | 12/2002 | Arndt et al. | 342/22 |
| 6,507,309 B2 * | 1/2003 | McMakin et al. | 342/22 |
| 6,703,964 B2 * | 3/2004 | McMakin et al. | 342/22 |
| 6,791,487 B1 | 9/2004 | Singh et al. | 342/22 |
| 6,856,271 B1 | 2/2005 | Hausner | 342/22 |
| 6,876,322 B2 * | 4/2005 | Keller | 342/22 |
| 6,894,636 B2 | 5/2005 | Anderton et al. | 342/22 |
| 6,903,677 B2 | 6/2005 | Takashima et al. | 342/70 |
| 6,914,552 B1 | 7/2005 | McEwan | 342/22 |
| 6,937,182 B2 * | 8/2005 | Lovberg et al. | 342/22 |
| 6,965,340 B1 * | 11/2005 | Baharav et al. | 342/22 |
| 6,967,612 B1 * | 11/2005 | Gorman et al. | 342/22 |
| 6,972,714 B1 * | 12/2005 | Baharav et al. | 342/179 |
| 6,992,616 B2 * | 1/2006 | Grudkowski et al. | 342/179 |
| 7,019,682 B1 | 3/2006 | Louberg et al. | 342/22 |
| 7,034,746 B1 * | 4/2006 | McMakin et al. | 342/22 |
| 7,119,740 B2 * | 10/2006 | Blasing et al. | 342/179 |
| 7,123,185 B2 * | 10/2006 | Fleisher et al. | 342/179 |
| 7,167,123 B2 * | 1/2007 | Hausner et al. | 342/22 |
| 7,180,441 B2 * | 2/2007 | Rowe et al. | 342/22 |
| 7,183,963 B2 * | 2/2007 | Lee et al. | 342/22 |
| 7,194,236 B2 * | 3/2007 | Lovberg et al. | 342/179 |
| 7,202,808 B2 * | 4/2007 | Fleisher et al. | 342/22 |
| 7,212,153 B2 * | 5/2007 | Rowe et al. | 342/179 |
| 7,248,204 B2 * | 7/2007 | Lovberg et al. | 342/22 |
| 7,253,766 B2 * | 8/2007 | Foote et al. | 342/22 |
| 7,265,709 B2 * | 9/2007 | Fleisher et al. | 342/22 |
| 7,319,233 B2 * | 1/2008 | Nelson | 342/22 |
| 7,327,304 B2 * | 2/2008 | Baharav et al. | 342/22 |
| 7,365,672 B2 * | 4/2008 | Keller et al. | 342/22 |
| 7,385,549 B2 * | 6/2008 | Lovberg et al. | 342/22 |
| 7,386,150 B2 * | 6/2008 | Fleisher | 342/22 |
| 7,405,692 B2 * | 7/2008 | McMakin et al. | 342/22 |
| 7,415,244 B2 * | 8/2008 | Kolinko et al. | 342/179 |
| 7,432,846 B2 * | 10/2008 | Martin et al. | 342/22 |
| 7,450,052 B2 * | 11/2008 | Hausner et al. | 342/22 |
| 7,492,303 B1 * | 2/2009 | Levitan et al. | 342/22 |
| 7,528,763 B2 * | 5/2009 | Rowe et al. | 342/22 |
| 7,626,400 B2 * | 12/2009 | Holbrook et al. | 342/22 |
| 7,889,113 B2 * | 2/2011 | Cardiasmenos et al. | 342/22 |
| 2004/0056790 A1 | 3/2004 | Lovberg et al. | |
| 2004/0140924 A1 | 7/2004 | Keller et al. | |
| 2004/0189512 A1 * | 9/2004 | Takashima et al. | 342/70 |
| 2005/0093733 A1 | 5/2005 | Lovberg et al. | |
| 2005/0110672 A1 | 5/2005 | Cardiasmenos et al. | |
| 2005/0122258 A1 | 6/2005 | Blasing et al. | |
| 2006/0017605 A1 | 1/2006 | Lovberg et al. | |

FOREIGN PATENT DOCUMENTS

| | | |
|---|---|---|
| WO | WO 2005/101053 A2 | 10/2005 |
| WO | WO 2006/088845 A2 | 8/2006 |

OTHER PUBLICATIONS

United Kingdom Search Report Sep. 4, 2007.
David M. Sheen et al., "Circularly Polarized Millimeter-Wave Imaging for Personnel Screening", Proceedings of the SPIE, SPIE, 2005, pp. 117-126, vol. 5789, Bellingham VA, USA, XP-002443705.
R Appleby et al., "Whole-Body 35-Ghz Security Scanner", Proceedings of the SPIE, SPIE, 2004, pp. 244-251, vol. 5410, No. 1, Bellingham VA, USA, XP-002443694.
J Detlefsen et al., "UWB Millimeter-Wave FMCW Radar Using Hilbert Transform Methods", 2006 IEE 9th International Symposium on Spread Spectrum Techniques and Applications (IEE Cat. No. 06TH8900), Aug. 28-31, 2006, pp. 46-48, Piscataway, NJ, USA, XP-002464248.
Ali Ashtari et al., "A Method for Combining Focused Monostatic and Bistatic GPR to Reduce Multipath Effects", Computational Advances in Multi-Sensor Adaptive Processing, 2005 1st IEEE International Workshop on Puerto Vallarta, Mexico, Dec. 13, 2005, pp. 28-31, Piscataway, NJ, USA, XP-10878643.
Mario Pauli et al., "Mine-Detection Using a Multistatic Antenna Setup and Non-Linear Inversion", Tenth International Conference on Ground Penetrating Radar, Jun. 21-24, 2004, pp. 83-85, vol. 1, Piscataway, NJ, USA, XP-10730996.
International Preliminary Report on Patentability (Form PCT/IB/373), Written Opinion of the International Search Authority (Form PCT/ISA/237) issued in corresponding International Patent Application No. PCT/GB2007/003329, Mar. 10, 2009, The International Bureau of WIPO, Geneva, CH.

* cited by examiner

SCANNERS

FIELD

The present invention relates to improvements in or relating to scanners, and is more particularly concerned with security scanners.

BACKGROUND

Security scanners find widespread use today at airports and other locations where security is of high importance. These take the form of baggage scanning machines where baggage is scanned as it passes along a conveyor belt and fixed scanners through which people must pass and which serve to reveal objects under a person's clothing such as small arms or explosives. In busy locations such as airports, long queues tend to develop when large numbers of objects and/or people need to be scanned.

Since the issue of security has become increasingly important at many locations where large numbers of people gather, it would be desirable to provide an improved body scanner that produces minimal obstruction or delay to the passage of people within the range of the scanner.

It is an object of the present invention to provide an improved scanner that is capable of scanning a person or object at a distance. It is a further object of the present invention to provide a high resolution scanner that produces minimal obstruction or delay to the passage of people within the range of the scanner.

The scanner achieves this by forming a radar profile of a clothed person or another object such as a bag carried by a person at a distance and does not require close proximity of the person or object to the scanner itself. This allows the scanner to be used for screening people entering a large sporting venue or transport station.

SUMMARY

In accordance with one aspect of the present invention, there is provided a security scanner, the scanner comprising a millimeter wave radar arrangement comprising an antenna system optimised for short-range active imaging and arranged to provide rapid high-resolution images of an object or person of interest and processing means for resolving the images so as to detect the presence of predetermined objects. The antenna system may utilise circular polarised radiation.

In one embodiment, the antenna system comprises a single mono-static antenna element. In an alternative embodiment, the antenna system comprises two mono-static antenna elements arranged as a single bi-static antenna. In a further embodiment, the antenna system comprises at least two mono-static antenna elements arranged as both a dual mono-static antenna and a bi-static antenna.

The antenna system may utilise a quasi-optical lens system or other millimeter wave antenna system such as a Cassegrain configuration to collimate the transmitted radar waves and to perform polar analysis of the returned radar waves. Preferably, the antenna system includes a frequency modulated continuous wave (FMCW) transmitter of sufficient bandwidth to enable high range resolution data to be extracted from the received radar waves, but it may include an interrupted frequency modulated (FMICW) transmitter in order to reject unwanted signals from objects at a range greater than the object of interest. Multiple radars may be deployed to examine more the one facet of a person, otherwise the person can reveal a changing aspect to a single radar as a consequence of his motion. Monostatic radars can be used to collect the retro-reflected return. Multistatic radars allow other facets to be examined.

Preferably, the antenna system includes low noise receivers in order to enable a low power transmitter to be used so minimising exposure of humans to potentially harmful non-ionising radiation. Additional sensors may be provided to supply additional output data, the output data from the antenna system being fused with that of additional sensors. For example, the additional sensors may include one or more of: passive millimeter-wave system, passive infrared system or high definition TV.

The processing means preferably includes means for comparing contrasts in reflectivity in the scanned images with predetermined expected values from skin and light clothing. The processing means may also include means for detecting predetermined behavioural or physical traits such as the effect on gait on carried weighty objects or stiff structures strapped to the person from the images of a scanned object or person.

In accordance with another aspect of the present invention, there is provided a turnstile access arrangement including at least one security scanner as described above. The turnstile access arrangement may be integrated into ticketing or personal identification tag (PIT) systems. Ideally, the turnstile arrangement should form one channel in a multi-channel configuration in order to maximise throughput.

The turnstile access arrangement may be include at least one of: a local area network, intranet or the internet, for providing command and control functionality to a wider network enabled security infrastructure.

BRIEF DESCRIPTION OF THE DRAWINGS

For a better understanding of the present invention, reference will now be made, by way of example only, to the accompanying drawings in which:—

DETAILED DESCRIPTION

The sensor arrangements of the present invention utilise a millimeter wave radar system that can achieve penetration of light clothing. The scattering of radar signals from metallic objects and dielectric materials such as glass or plastics will be stronger than that of skin and light clothing allowing for the detection of objects carried within or beneath persons clothing.

The frequency band at which the millimeter wave radar operates allows a lateral resolution of the order of the size of the objects being sought, typically 100 mm to 250 mm, whilst the range resolution of the radar can achieve a similarly fine range resolution.

Figure 1:
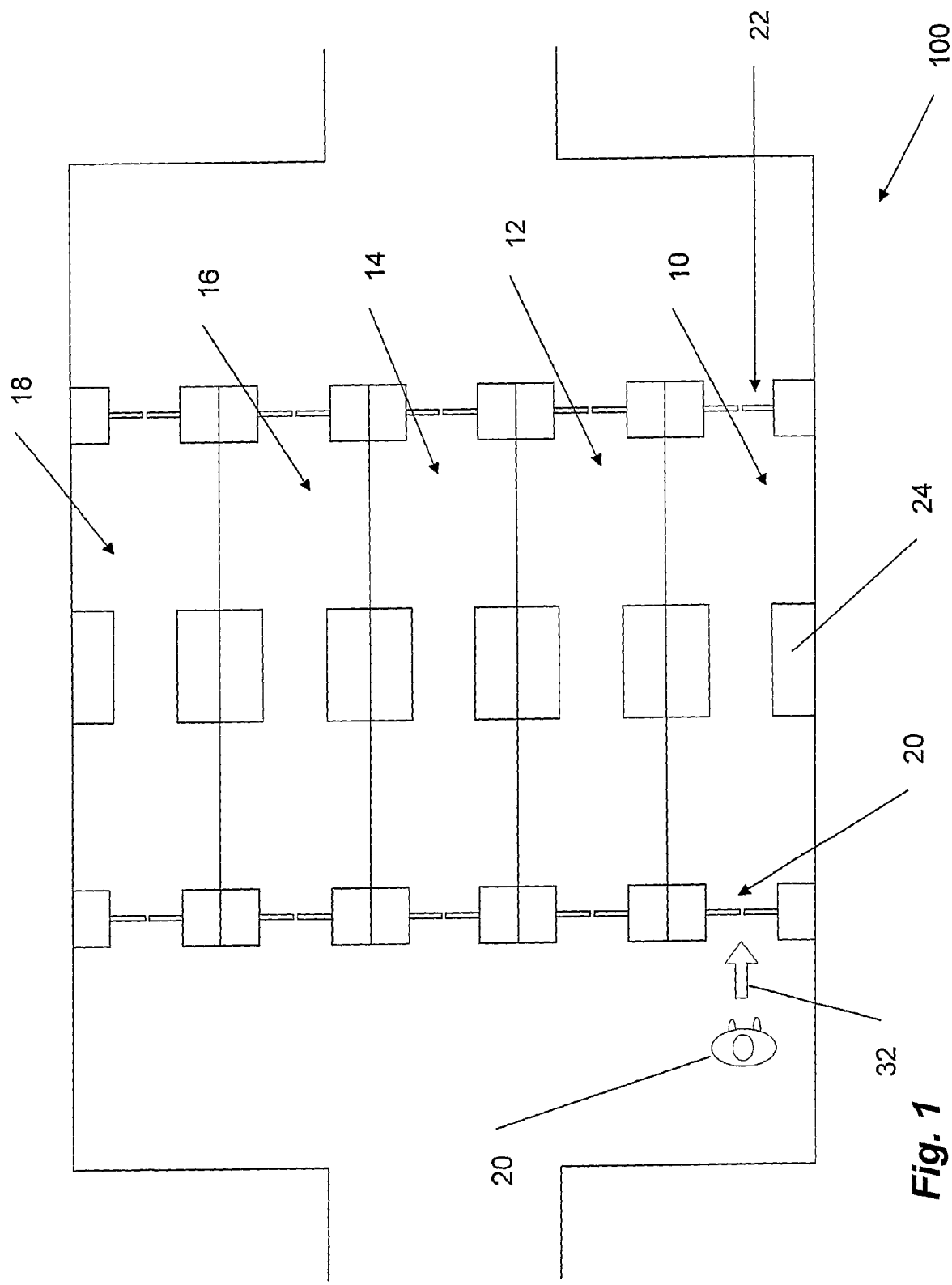
FIG. 1 illustrates a turnstile arrangement in accordance with the present invention.

Referring initially to FIG. 1, a five-channel turnstile arrangement 100 is shown having channels 10, 12, 14, 16, and 18, each including an inlet turnstile 20 and an outlet turnstile 22. A sensor archway 24 is located between the inlet turnstile 20 and the outlet turnstile 22 and area 26 located between the inlet turnstile 20 and the outlet turnstile 22 can be termed the processing area.

Only the turnstiles 20, 22 and the sensor archway 26 associated with a single channel 10 are referenced for clarity, but it will be appreciated that each channel 10, 12, 14, 16, 18 has identical components.

Each turnstile channel 10, 12, 14, 16, 18 is designed to permit only one person to pass through at a time. In operation, a person 30 approaches the turnstile channel 10 in the direction of arrow 32. The inlet turnstile 20 is opened to permit the person 30 to enter the processing area 26 where the radar will scan them as they walk through. Once at the outlet turnstile 22 having passed through the sensor archway 24, the outlet turnstile 22 is opened to allow the person 30 to exit the turnstile channel 10 and to proceed on their way.

The person 30 may physically operate the inlet and outlet turnstiles 22 and 24 on approach or the turnstiles 22 and 24 may be opened automatically in response to a proximity detector or other such sensor (not shown). The operation of the inlet and outlet turnstiles 22 and 24 may be coordinated so that the inlet turnstile 20 opens, as or just after, the outlet turnstile 22 closes after a person has exited. At sports or entertainment venues, such a turnstile arrangement could be integrated with ticketing and other 'smart' card based identification systems. However, any suitable control system can be used to implement the operation of the inlet and outlet turnstiles.

Figure 2:
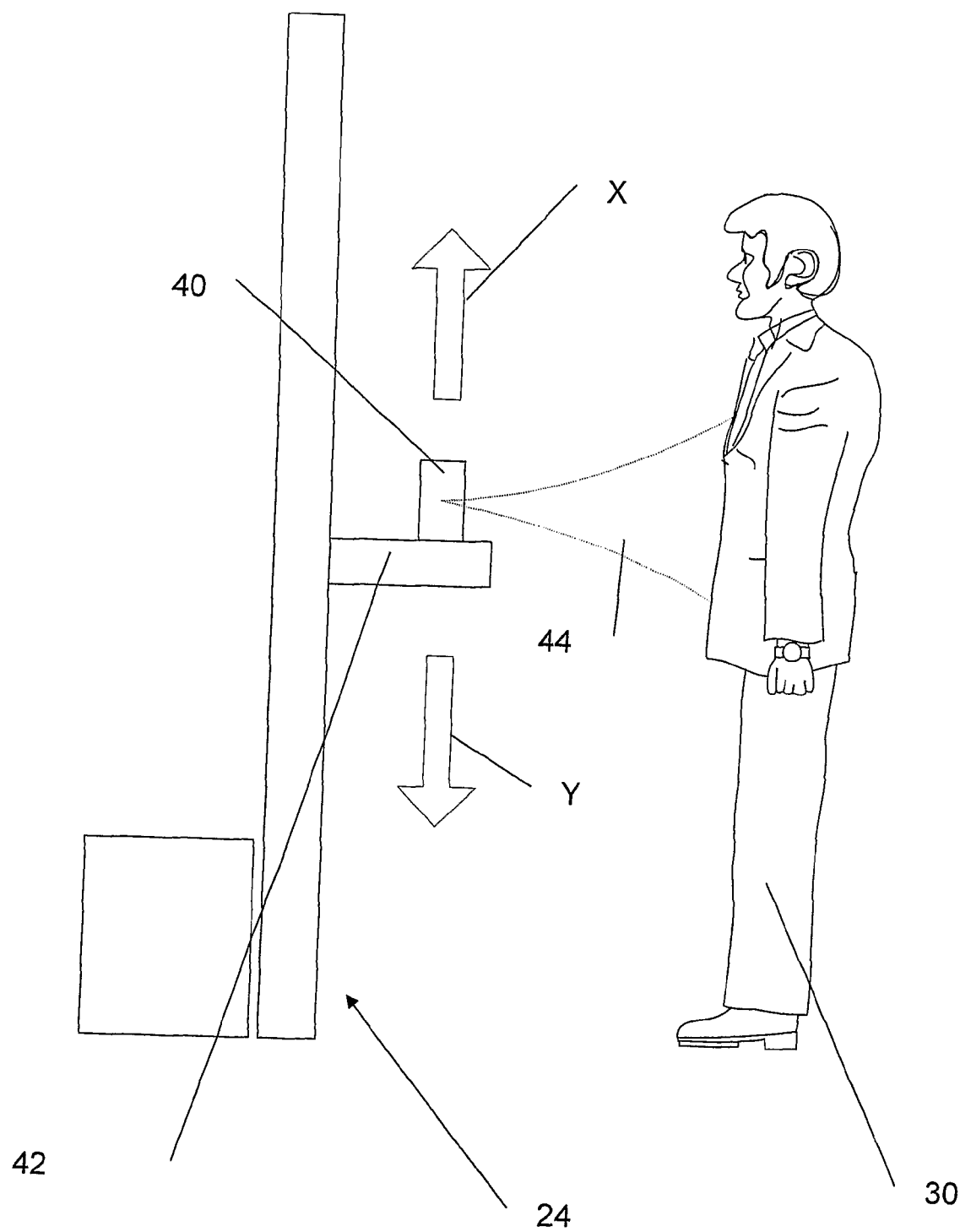
FIG. 2 illustrates a more detailed view of one of the channels in the turnstile arrangement of FIG. 1.

Referring now to FIG. 2, a radar system 40 is mounted on a platform 42 associated with the sensor archway 24. A person 46 is also shown approaching the sensor archway 24 and radar system 40. The platform 42 is arranged to move upwards and downwards in a vertical plane as indicated by arrows X and Y, in a cyclical fashion. It will be appreciated that movement of the platform 42 in this way minimises the propagation distance between the radar system 40 and the area being scanned in comparison to a system incorporating angle scanning in elevation from a greater distance. Since the actual area of a person's body being illuminated at any instant is the product of the angular beam width in radians and the range from the radar to that part of the body being scanned, lateral resolution is improved by minimising the range between radar and the area being scanned since diffractive spreading of the radar beam 44 from the radar system 40 is limited Although a person may remain stationary during the scanning process, it is more likely that the person will continue to walk through the processing area 26 towards the outlet turnstile 22 as the scanning is carried out. This is advantageous in that a faster throughput of persons is achieved and in that the aspect of the person (i.e., the movement relative to scanner) is varied in addition, useful information may be picked up from the person's gait (i.e. way of walking) that could be exploited by a suitable algorithm incorporated within the scanner. The scanning process will typically take a few seconds in which time the person being scanned may move a distance in the order of 1.5 meters. Hence, translational movement of the platform 42 in the vertical axis is also advantageous in that a more normal incidence would be achieved to the body's surface.

The turnstile system may incorporate a local area network, intranet or the internet arranged to provide command and control functionality to a wider network enabled security infrastructure.

The radar system 40 and platform 42 is mounted within a housing (not shown) so as to avoid contact between the person being scanned with moving parts. The housing is formed within the sensor archway 24 and comprises a largely radar transparent (dielectric) material such as polycarbonate or poly ethyl-ethyl ketone (PEEK).

In the embodiment illustrated, the radar system 40 comprises an antenna in the form of a quasi-optical lens system to collimate the transmitted radar waves and to perform polar analysis of the returned radar waves. However it should be appreciated that any other millimeter wave antenna system such as a Cassegrain configuration may be used. The antenna system includes a low power, frequency modulated continuous wave (FMCW) transmitter of sufficient bandwidth to enable high range resolution data to be extracted from the received radar waves. The transmitter is of low power and cooperates with low noise receivers so as to minimise exposure of humans to potentially harmful non-ionising radiation. A rapid frequency modulation scheme is chosen so as to allow a short-range return to appear at a suitable baseband frequency. The baseband frequency is given by:

$$df/dt 2R/c$$

where df/dt is the waveform ramp rate, R is the range and c is the speed of light. For example, for a range of 2 meters and a ramp rate of 10 to 12 Hz/second gives a baseband IF=13.3 KHz. The frequency ramps may be provided as a sawtooth waveform of frequency versus time, but the flybacks may tend to shock the receiver amplifier especially when the a.c. coupling capacitor is large (see FIG. 3) with a long time constant formed by the product of the capacitance C and the input impedance of the amplifier. Hence, a managed flyback at a modest rate is recommended or a triangular waveform with rounded turn-arounds at the upper and lower frequency extremes so as to limit receiver saturation. For 10 cm resolution in range, the swept bandwidth would be given by $$B = \frac{c}{2\Delta R} = 1.5 \text{ GHz}.$$

Hence, a ramp rate of $$\frac{B}{\frac{df}{dt}} = 1.5$$

milliseconds is required. The antenna system may include an interrupted frequency modulated (FMICW) transmitter in order to reject unwanted signals from objects at a range greater than the object of interest.

In one embodiment of the radar system 40, a fast azimuth scan performed by a set of synchronised scanning mirrors (not shown) is performed. This could be performed as a scan at fixed width which could be achieved from a crank drive, or an intelligent scan adapting to the angular extent of the person as it approaches. The speed of the scan is such as to achieve one lateral resolution increment every waveform cycle. Hence in the example given above with a ramp rate of 1.5 milliseconds and a range resolution of 10 cm, the speed of the scan of an illuminated patch is 0.1 meters in 1.5 milliseconds (67 m/s) which over 2 meters (range R) is approximately 33 radians per second. The receiver further incorporates an amplifier, an anti aliasing filter, an ADC, and a fast Fourier transform (FTT) (not shown) to provide a group of range cells for each scan position (i.e. vertical position & azimuth angle). This data is then submitted to appropriate algorithms within the scanner for analysis.

Mono-static (i.e., one that receives through the same antenna as it transmits through), bi-static or multi-static reception can be implemented in accordance with the particular application with each radar receiver being capable of supporting dual polar reception (i.e., co-polar and cross-polar)

Figure 3:
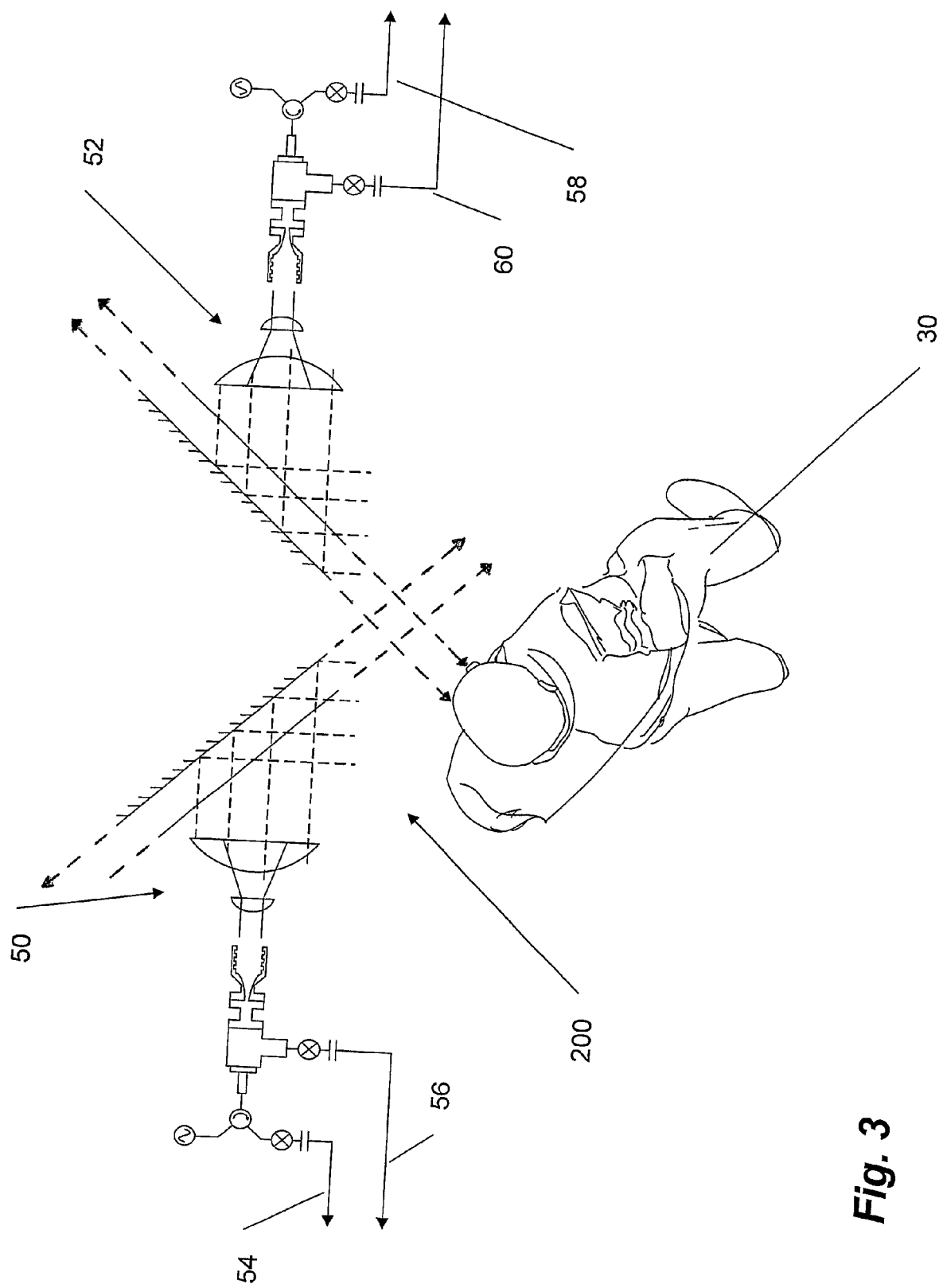
FIG. 3 illustrates a dual monostatic/bistatic sensor arrangement for use in the turnstile arrangement of FIG. 1.

FIG. 3 illustrates one embodiment of a sensor arrangement 200 of the radar system 40. The sensor arrangement 200 comprises two mono-static antennas 50, 52 with each antenna providing co-polar 54, 58 and cross polar 56 60 outputs. The mirrors are scanned in azimuth with a drive means such as a motor (not shown) associated with each mirror and an angle measuring means. The antennae are disposed horizontally so as to capture scattering from surfaces that are not perfectly normal to the transmitter. A triangular waveform allows the frequency shifts due to Doppler (2fv/c) and range (2R(df/dt)/c to be separated in processing because the slope change reverses the range dependent shift. Hence, it should be possible to interpret the range profiles of each beam position. Each set of range cells is captured with the vertical scan position and the mirror angle and the co-polar and cross polar outputs are processed separately. However, it will readily be appreciated that the output signals 54, 56, 58, 60 can be processed together as if the two mono-static antennas 50, 52 form the two parts of a bi-static antenna.

Algorithms to detect hidden objects can exploit the information provided by the scanning radar by analysing in real time, the contrast in reflectivity in comparison to that expected from skin and light clothing. This is expected to be conspicuous for metals and dielectrics such as glass or hard plastics. The polarisation of the radar return also provides further information that may be useful to an alerting detection algorithm. In reconstructing the body movement whilst walking, behavioural traits may be identified by intelligent algorithms such as the effect on gait on carried weighty objects or stiff structures strapped to the person.

Figure 4:
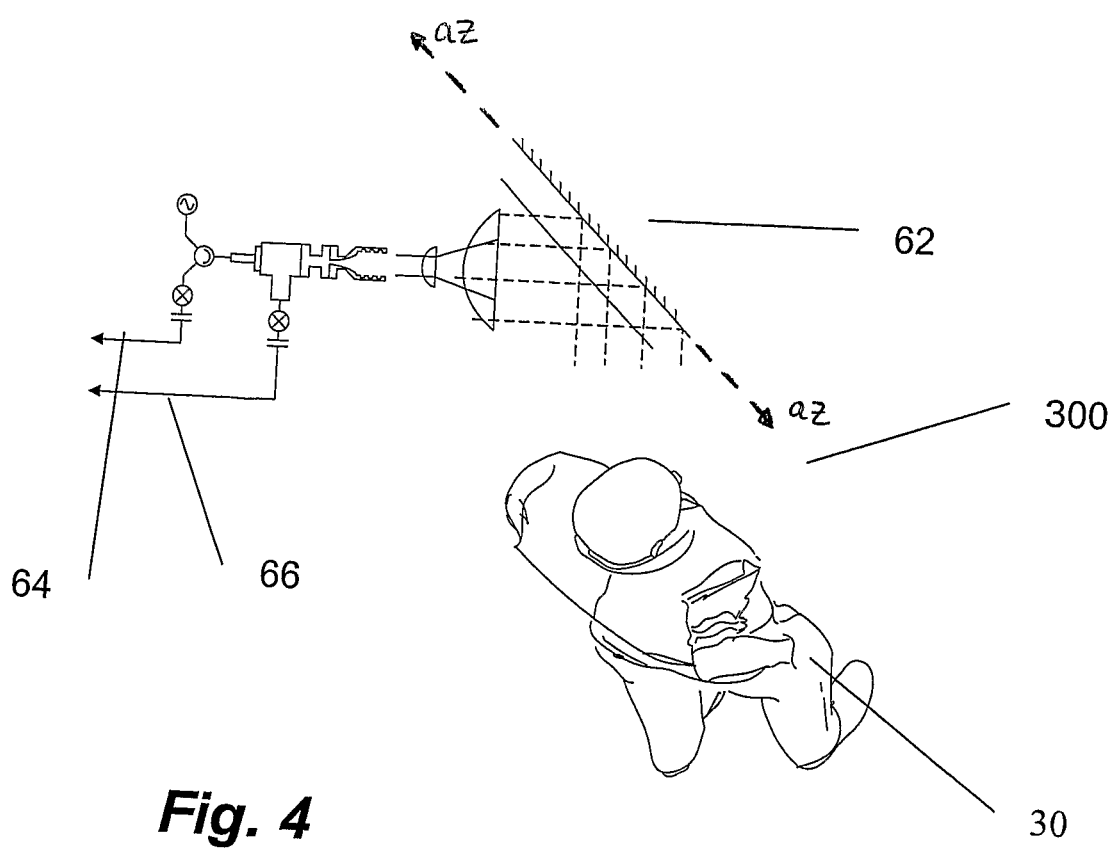
FIG. 4 illustrates a single monostatic sensor arrangement for use in the turnstile arrangement of FIG. 1.

FIG. 4 illustrates a second embodiment of a sensor arrangement 300 of radar system 40. In this embodiment, the sensor arrangement 300 comprises a single mono-static antenna 62 having output signals 64, 66. The sensor operates in a similar manner as described with reference to FIG. 3, but it should be appreciated that this simpler arrangement has a reduced capability.

Figure 5:
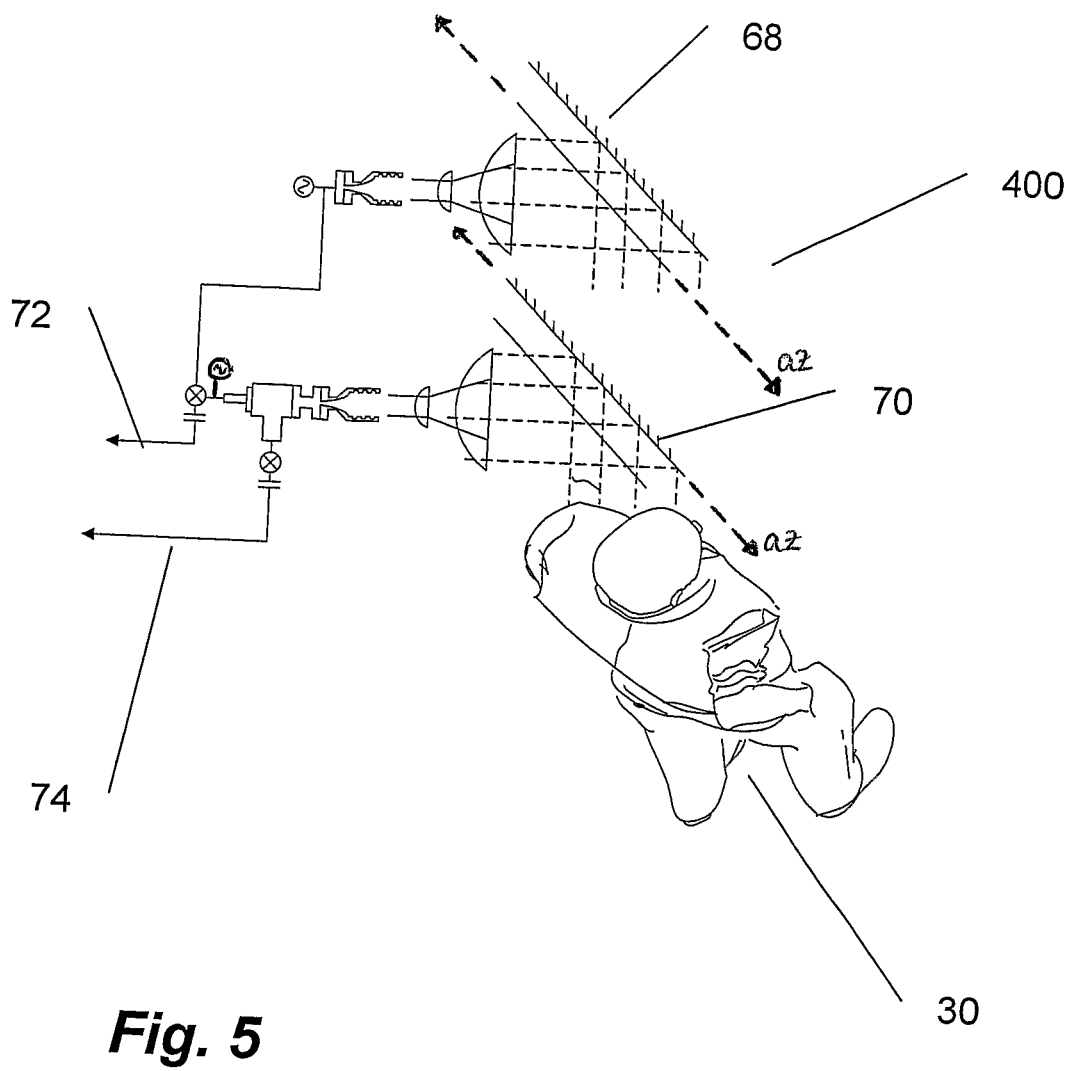
FIG. 5 illustrates a single bistatic sensor arrangement for use in the turnstile arrangement of FIG. 1.

A further embodiment of the sensor arrangement 400 of radar system 40 is shown in FIG. 5 and comprises a single bi-static arrangement of two horizontally separated antennas 68, 70. During scanning, the antennae 68, 70 are controlled so as to align the receiver to the area on the person's body where the transmitter is illuminating at a particular instant. The co-polar output from the receive antenna 70 is processed together with the cross polar outputs 74. This bistatic radar configuration achieves greater transmit to receive isolation which reduces the receiver saturation effects discussed with reference to FIG. 3 and has improved short range sensitivity. In addition, this arrangement is capable of scanning facets of a body that are angled at non normal incidence to the transmitted signal and hence is more accurate.

It is often difficult to process short-range radar due to eclipsing of the receive range gate by the outgoing transmit pulse. By using a FMCW waveform this difficulty is overcome. However, the FMCW range profile can be corrupted by the effect of movement causing a Doppler shift in the return, which gives a misleading range. The use of a very high FMCW ramp rate reduces the effect of receive and transmit eclipsing further as the baseband frequency increases and also the effects of a Doppler shift. Since the range dependent frequency shift is slope dependent, whereas the Doppler shift is not, a comparison of the spectra from an up and down ramp will reveal the Doppler shift. The Doppler offset waveform can then subtracted if a triangular FMCW waveform, and appropriate processing, is used. However, the speed of the area being scanned cannot alter dramatically during the scan time so a meaningful profile should result even without Doppler correction.

It will be appreciated that various trade-offs are made in conjunction with the receiver sensitivity and power requirements, and that they are tailored in accordance with system requirements for, and field conditions, at a particular installation.

Other embodiments can employ additional sensors to supply additional output data, the output data from the antenna system being fused with that of additional sensors so as increase the chance of detecting undesirable objects. For example, the additional sensors may include one or more of: passive millimeter-wave system, passive infrared system or high definition TV.

The invention claimed is:

1. A security scanner, comprising:
a millimeter wave radar arrangement that includes an antenna system for short-range active imaging using a radar waveform having a waveform cycle, wherein the antenna system includes a mirror system for scanning an object or person of interest at one lateral resolution increment per waveform cycle, and generates image signals as a result of the scan; and
processing means for resolving the images generated by the antenna system to detect the presence of predetermined objects.

2. The security scanner according to claim 1, wherein the antenna system utilises circularly polarised radiation.

3. The security scanner according to claim 1, wherein the antenna system comprises a single mono-static antenna element.

4. The security scanner according to claim 1, wherein the antenna system comprises two mono-static antenna elements arranged as a single bi-static antenna.

5. The security scanner according to claim 1, wherein the antenna system comprises at least two mono-static antenna elements arranged as a dual mono-static antenna.

6. The security scanner according to claim 1, wherein the antenna system utilises a quasi-optical lens system to collimate the transmitted radar waves and to perform polar analysis of the returned radar waves.

7. The security scanner according to claim 1, wherein the antenna system includes a frequency modulated continuous wave (FMCW) transmitter.

8. The security scanner according to claim 1, wherein the antenna system includes an interrupted frequency modulated (FMICW) transceiver that rejects unwanted signals from objects at a range greater than the object of interest.

9. The security scanner according to claim 7, comprising a low power transmitter.

10. The security scanner according to claim 1, wherein the mirror system includes a plurality of synchronised scanning mirrors arranged to scan in the azimuth plane.

11. The security scanner according to claim 1, wherein the processing means includes means for comparing contrasts in reflectivity in the scanned images with predetermined expected values.

12. The security scanner according to claim 1, wherein the processing means is configured for detecting predetermined behavioural or physical traits from the images of a scanned object or person.

13. The security scanner according to claim 1, wherein the antenna system comprises at least two mono-static antenna elements arranged as a bi-static antenna.

14. A security scanner, comprising:
- a millimeter wave radar arrangement that includes an antenna system for short-range active imaging using a radar waveform having a waveform cycle, wherein the antenna system includes a mirror system for scanning an object or person of interest at one lateral resolution increment per waveform cycle, and generates image signals as a result of the scan; and
- processing means for resolving the images generated by the antenna system to detect the presence of predetermined objects,
- wherein the antenna system includes an interrupted frequency modulated (FMICW) transceiver that rejects unwanted signals from objects at a range greater than the object of interest.

* * * * *

UNITED STATES PATENT AND TRADEMARK OFFICE
CERTIFICATE OF CORRECTION

| | |
|---|---|
| PATENT NO. | : 8,674,875 B2 |
| APPLICATION NO. | : 12/440394 |
| DATED | : March 18, 2014 |
| INVENTOR(S) | : Christopher Ralph Carter et al. |

It is certified that error appears in the above-identified patent and that said Letters Patent is hereby corrected as shown below:

Title Page, Item (22) PCT Filed: change "Sept. 7, 2007" to --Sep. 05, 2007--.

Signed and Sealed this
Third Day of June, 2014

Michelle K. Lee
*Deputy Director of the United States Patent and Trademark Office*